Patented Jan. 28, 1930

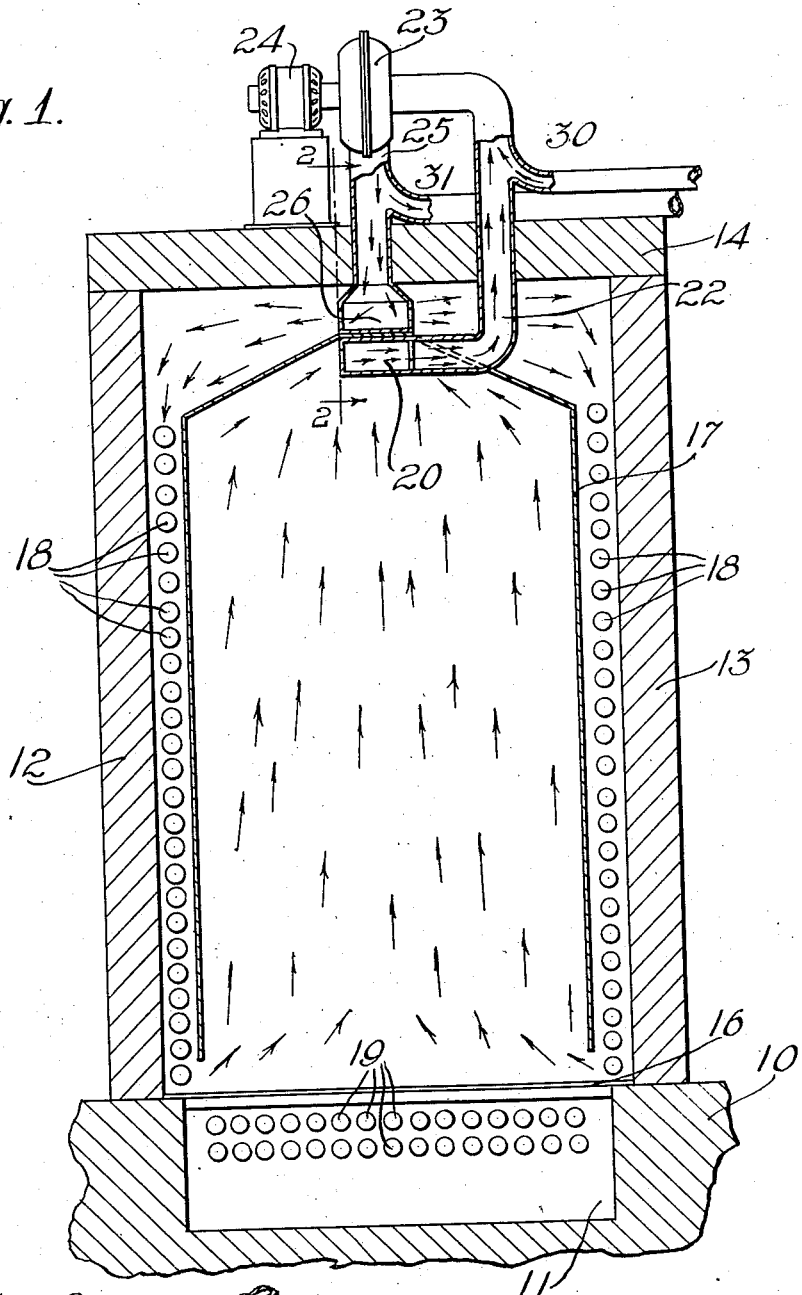
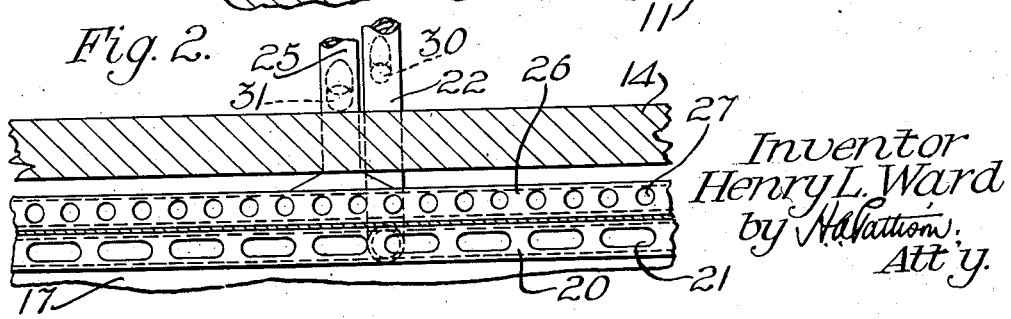

1,744,817

UNITED STATES PATENT OFFICE

HENRY L. WARD, OF CHICAGO, ILLINOIS, ASSIGNOR TO WESTERN ELECTRIC COMPANY, INCORPORATED, OF NEW YORK, N. Y., A CORPORATION OF NEW YORK

OVEN

Application filed December 9, 1924. Serial No. 754,763.

This invention relates to improvements in ovens, particularly of the type used for drying and baking coated surfaces.

The object of the invention is to provide an improved oven of this type.

According to the main features of the invention an oven is provided with a baffle which separates it into an outer enclosure in which heating elements, preferably pipes in which hot oil is circulated, are contained; and an interior enclosure in which the parts to be treated are placed. Air is circulated over the heating elements and then in contact with the parts to be treated after which by suitable ducts the air is withdrawn from the inner enclosure of the oven and fed into the outer enclosure thereof and is thus recirculated over the heating elements and in contact with the parts to be treated. Means is provided for removing a small portion of the air as it is being recirculated and an equal supply of fresh air is simultaneously brought into the oven atmosphere through small openings which are associated with the recirculating ducts.

Further details of the invention will be apparent from the following description taken with the accompanying drawings, in which Fig. 1 is a transverse vertical sectional view through an oven embodying the invention, certain details being shown in elevation, and Fig. 2 is a sectional view taken along the line 2—2 of Fig. 1 looking in the direction of the arrows.

Refering now more particularly to the attached drawing in which like numerals are employed to designate similar members throughout the several views, the oven consists of a base member 10 having a hollowed out portion 11, the side walls 12 and 13 and a roof 14 which members, together with end walls (not shown), form the main enclosure of the oven. A floor plate 16 and an inner baffle 17 form an inner enclosure which is adapted to receive the parts to be treated within the oven. Suitable heating elements 18 and 19 which are preferably pipes in which hot oil is circulated are provided to maintain within the oven the temperature desired. A suction member 20 having openings 21 extends the full length of the inner enclosure of the oven and has connected therewith an air duct 22 leading to a fan 23 driven by a motor 24 which is suitably positioned with respect to the oven. The fan 23 exhausts into an air duct 25 which communicates with an outlet member 26 having ports 27. This outlet member extends the full length of the oven, but is confined to the portion of the oven between the baffle 17 and the main walls of the oven. The ducts 22 and 25 together with the fan 23 are thus adapted to remove the oven atmosphere from the inner enclosure of the oven and feed it into the outer enclosure to be recirculated over the heating elements and in contact with the parts to be treated. Smaller ducts 30 and 31 lead into the vacuum and outlet side of the recirculating ducts, respectively, each of these smaller ducts being preferably in communication with the open air.

The operation of the oven is as follows: The parts to be treated are placed within the inner chamber of the oven and the motor 24 driving the fan 23 is set in motion. This causes a suction through the openings 21 and an exhaust of air through the ports 27. This causes a continuous circulation and recirculation of the oven atmosphere in the direction indicated by the arrows. As the circulation continues a small portion of the oven atmosphere is exhausted through the duct 31 and simultaneously an equal amount of fresh air is supplied through the duct 30. As the gases and the like which result from the treatment of materials in the furnace gradually are diffused into the oven atmosphere, the continuous intake of a small amount of air through the duct 30 has the effect of continuously reducing the concentration of such gases. None of this fresh air comes directly in contact with the parts to be treated, but as indicated by the drawing, it is mixed with the greater volume of the oven atmosphere as it is taken into the recirculating duct, and then passes over the heating elements 18 and 19 before it comes in contact with the parts which are being treated in the oven.

What is claimed is:

1. A heating oven consisting of an enclosure, heating elements disposed along a plurality of sides thereof, an enclosure within said first-mentioned enclosure disposed substantially wholly between the heating elements and connected with the first mentioned enclosure at the lower portion thereof to provide an inlet for air heated by the element, means at the top of said inner enclosure for removing the oven atmosphere, means associated therewith for causing said atmosphere to enter the outer enclosure and pass over the heating elements, and means associated with the two above mentioned means for constantly removing a portion of the oven atmosphere, and simultaneously replacing the removed portion with fresh air.

2. In a heating oven, a heating element, means for positively circulating the heated gas, a gas outlet member positioned at the top of the oven and extending substantially the length of the oven, a gas inlet member substantially coextensive with and adjacent to the outlet member, and a baffle disposed between said members and depending therefrom causing the gas to traverse and retraverse the area of the baffle in passing from the outlet to the inlet member.

3. In a heating oven, gas circulating means, a gas outlet member for discharging gas in opposite directions, a gas inlet member for receiving gas from opposite directions, and an inverted U-shaped baffle disposed between said members causing the gas to flow in equal opposite paths.

4. In a heating oven, gas circulating means, a gas outlet member disposed longitudinally of the oven and provided with a plurality of oppositely disposed apertures, a gas inlet member disposed longitudinally of the oven and provided with a plurality of oppositely disposed apertures, and means for directing the gas from the outlet member downwardly in a plurality of parallel paths.

5. In a heating oven, heating elements disposed on opposite sides of the oven, gas circulating means, a gas outlet member having a plurality of oppositely disposed apertures, a baffle, said outlet member and baffle cooperating to cause the gas to divide and pass over the heating elements on opposite sides of the oven, and an inlet member substantially coextensive with and adjacent to the outlet member for withdrawing the gas from the oven.

In witness whereof, I hereunto subscribe my name this 28th day of November A. D., 1924.

HENRY L. WARD.